US012652335B2

(12) United States Patent
Hoang et al.

(10) Patent No.: US 12,652,335 B2
(45) Date of Patent: Jun. 9, 2026

(54) ECU INTERFACE MANAGEMENT

(71) Applicant: Cummins Inc., Columbus, IN (US)

(72) Inventors: Dong P. Hoang, Columbus, IN (US);
Randall L. Wolf, Indianapolis, IN
(US); Christopher S. York,
Greenwood, IN (US); Mallika Reddy,
Columbus, IN (US)

(73) Assignee: Cummins Inc., Columbus, IN (US)

( * ) Notice: Subject to any disclaimer, the term of this
patent is extended or adjusted under 35
U.S.C. 154(b) by 82 days.

(21) Appl. No.: 18/694,525

(22) PCT Filed: Sep. 21, 2022

(86) PCT No.: PCT/US2022/076772
§ 371 (c)(1),
(2) Date: Mar. 22, 2024

(87) PCT Pub. No.: WO2023/049740
PCT Pub. Date: Mar. 30, 2023

(65) Prior Publication Data
US 2024/0396969 A1 Nov. 28, 2024

Related U.S. Application Data

(60) Provisional application No. 63/261,579, filed on Sep.
24, 2021.

(51) Int. Cl.
*H04L 67/12* (2022.01)

(52) U.S. Cl.
CPC .................................... *H04L 67/12* (2013.01)

(58) Field of Classification Search
CPC ........... H04L 2012/40273; H04L 12/46; H04L
12/4625; H04L 2012/40215; H04L 67/12
See application file for complete search history.

(56) References Cited

U.S. PATENT DOCUMENTS 10,306,025 B2    5/2019  Ripke
10,320,911 B2    6/2019  Carlesimo et al.
(Continued)

FOREIGN PATENT DOCUMENTS

CN        201237804        5/2009
EP          2287691        2/2011
(Continued)

OTHER PUBLICATIONS

International Search Report and Written Opinion, PCTUS2022076772,
Cummins Inc.,Nov. 23, 2023, 14 pgs.

*Primary Examiner* — David R Lazaro
(74) *Attorney, Agent, or Firm* — Taft, Stettinius &
Hollister LLP

(57) ABSTRACT

A computer system includes a plurality of communication
interfaces. A first interface configured to bidirectionally
communicate with a first ECU engineering tool using a first
communication protocol. A second interface configured to
bidirectionally communicate with a second ECU engineer-
ing tool using a second communication protocol differing
from the first communication protocol. A third interface is
configured to bidirectionally communicate with an elec-
tronic control unit (ECU) using a third communication
protocol. A connection manager is configured to provide
concurrent utilization by the first interface and the second
interface of a single communication session with the ECU
via the third interface.

20 Claims, 3 Drawing Sheets

(56)                    References Cited

U.S. PATENT DOCUMENTS

| | | | |
|---|---|---|---|
| 10,873,526 B2 | 12/2020 | Vasudevan et al. | |
| 11,348,382 B1 * | 5/2022 | Herron .................... | H04W 4/40 |
| 11,954,946 B1 * | 4/2024 | Herron ................. | G07C 5/0808 |
| 2013/0159466 A1 * | 6/2013 | Mao ........................ | H04L 67/12 |
| | | | 709/218 |
| 2014/0071953 A1 | 3/2014 | Tian et al. | |
| 2015/0052226 A1 * | 2/2015 | Rude ........................ | H04L 67/34 |
| | | | 709/219 |
| 2015/0254909 A1 * | 9/2015 | Harata ............... | G05B 23/0216 |
| | | | 701/31.5 |
| 2016/0335816 A1 * | 11/2016 | Thoppae ................. | H04L 67/12 |
| 2020/0064803 A1 | 2/2020 | Dressler et al. | |
| 2020/0314031 A1 * | 10/2020 | Kaku .................. | H04L 49/3009 |
| 2021/0009054 A1 * | 1/2021 | Hirano ................... | H04L 12/10 |
| 2024/0396969 A1 * | 11/2024 | Hoang ................... | H04L 67/12 |

FOREIGN PATENT DOCUMENTS

| | | |
|---|---|---|
| EP | 3087696 | 11/2016 |
| EP | 2649531 | 8/2018 |
| WO | 2020198667 | 10/2020 |

* cited by examiner

ECU INTERFACE MANAGEMENT

CROSS-REFERENCE

This application claims priority to and the benefit of International Patent Application No. PCT/US22/76772, filed Sep. 21, 2022, which claims priority to and the benefit of U.S. Provisional Application No. 63/261,579 filed Sep. 24, 2021, which are hereby incorporated by reference in their entirety.

TECHNICAL FIELD

The present application relates apparatuses, methods, and systems for managing interfaces providing communication between an electronic control unit (ECU) and a plurality of ECU engineering tools.

BACKGROUND

An ECU interface may provide communication between an ECU and an ECU engineering tool configured to perform a number of engineering functions relative to the ECU such as programming operations and data acquisition operations. ECU interfaces may be limited in providing such communication. Technical limitations of a given communication protocol may limit the number of engineering tools that can communicate with an ECU via an ECU interface. Rules imposed by a standard-setting or regulatory authority may also impose such limitations. There remains a need for the unique apparatuses, methods, systems, and techniques disclosed herein.

DISCLOSURE OF EXAMPLE EMBODIMENTS

For the purposes of clearly, concisely, and exactly describing example embodiments of the present disclosure, the manner, and process of making and using the same, and to enable the practice, making and use of the same, reference will now be made to certain example embodiments, including those illustrated in the figures, and specific language will be used to describe the same. It shall nevertheless be understood that no limitation of the scope of the invention is thereby created and that the invention includes and protects such alterations, modifications, and further applications of the example embodiments as would occur to one skilled in the art.

SUMMARY OF THE DISCLOSURE

Certain embodiments include unique apparatuses, methods, and systems providing multiple client interfaces with concurrent utilization of a single communication session between a machine-to-machine interface and an ECU. Further embodiments, forms, objects, features, advantages, aspects, and benefits shall become apparent from the following description and drawings.

DETAILED DESCRIPTION OF EXAMPLE EMBODIMENTS

Figure 1:
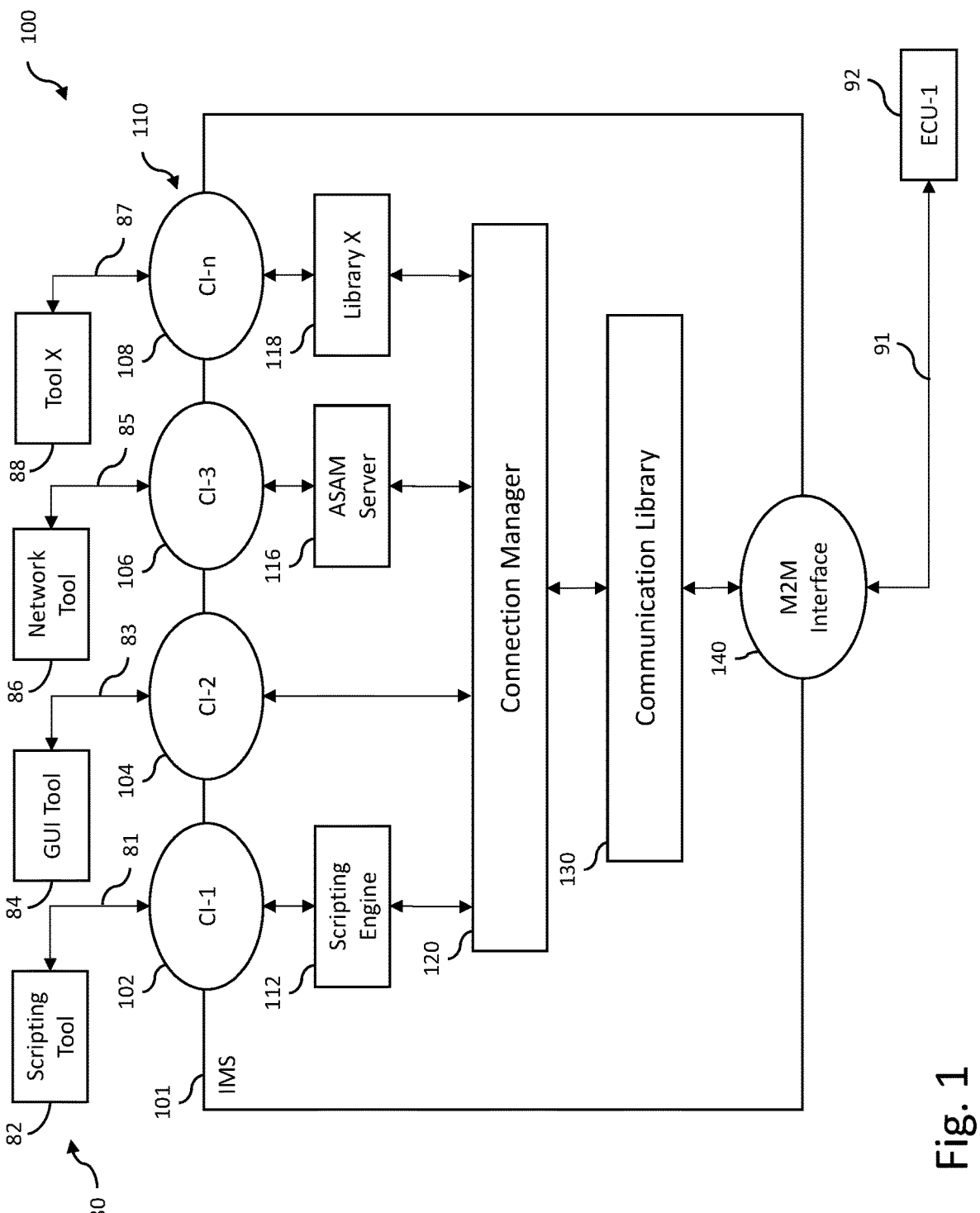
FIG. 1 is a schematic diagram illustrating certain aspects of an example system according to the present disclosure.

With reference to FIG. 1, there is illustrated a computer system 100. Computer system 100 may be provided and implemented in a number of forms including, for example, as a desktop, laptop, tablet, smart phone, server, workstation, or other types of computer systems. In some forms, computer system 100 may be provided and implemented in a single computer or computing device. In other forms, computer system 100 may be provided and implemented in multiple computers or computing devices. The various forms of computer system 100 include one or more processors and one or more non-transitory memory media configured with instructions executable by the one or more processors to perform a number of functions and operations and to implement and operate a number of software and communication components according to the present disclosure.

Computer system 100 includes an example interface management system (also referred to herein as "IMS 101" or "system 101") which is configured to provide and manage communication between an electronic control unit ("ECU") 92 and a plurality of ECU engineering tools 80. It shall be appreciated that an electronic control unit or ECU refers to any of a number of unitary electronic control systems embedded in or dedicated to operation of a particular machine or system, for example, an engine, powertrain, transmission, hybrid power system, vehicle, battery system, motor, fuel cell, or other machines or systems. It shall be further appreciated that an ECU engineering tool is an application or system capable of adjusting internal parameters of an ECU and acquiring current values of internal parameters and variables of an ECU. The adjusting of internal parameters of an ECU may include, for example, performing programming, calibration, or operational adjustments such as reflashing, modifying or writing firmware, program instructions, calibrations, parameters, variables, or other operational values. The acquiring current values of internal parameters and variables of an ECU may include data logging, data filtering, reading particular variables or parameters, reading diagnostic codes, clearing or rewriting diagnostic codes, or various other operations utilized in evaluating, monitoring or testing an ECU.

The ECU 92 is physically separate from the computer system 100 and is connected to the computer system 100 by a communication link 91 which may be a network connection such as a CAN or Ethernet connection, a dedicated data link or dedicated wire connection, or wireless connection. The communication link 91 supports and is configured to utilize a particular communication protocol providing read and write access to the ECU 92 suitable for utilization by an ECU engineering tool. Examples of such protocols include, for example, a universal measurement and calibration protocol such as XCP or a datagram protocol such as UDS.

IMS 101 includes a plurality of client interfaces 110 which are configured to provide communication between IMS 101 and respective ECU engineering tools 80, Each of the client interfaces 110 supports and is configured to utilize a particular communication protocol utilized by a respective one of the ECU engineering tools 80. In the illustrated example, the plurality of client interfaces 110 includes client interfaces 102, 104, 106, and 108.

Client interface 102 is configured to bidirectionally communicate with a scripting tool 82 using a scripting communication protocol via a communication session 81 established between client interface 102 and scripting tool 82. The scripting tool 82 may comprise software stored in a nontransitory memory medium and executed and operated by computer system 100. Alternatively, the scripting tool 82 may comprise software stored in a nontransitory memory medium of and executed and operated by another computer system in operative communication with computer system 100. The scripting tool 82 is preferably configured to execute scripts written in a scripting language (e.g., ECMAScript, JavaScript, Python, Visual Basic, or other scripting languages) to perform various programming and testing operations relative to an ECU or otherwise adjusting internal parameters of the ECU 92 or acquiring current values of internal parameters and variables of the ECU 92.

In the illustrated embodiment, a scripting engine 112 supports the client interface 102 in communicating via the particular scripting communication protocol utilized by scripting tool 82. In other embodiments, the client interface 102 may be supported by other components or may be self-sufficient in communicating via the particular scripting communication protocol utilized by scripting tool 82.

Client interface 104 is configured to bidirectionally communicate with a graphical user interface (GUI) tool 84 using a GUI communication protocol via a communication session 83 established between client interface 104 and GUI tool 84. The GUI tool 84 may comprise software stored in a nontransitory memory medium of and executed and operated by computer system 100. Alternatively, the GUI tool 84 may comprise software stored in a nontransitory memory medium of and executed and operated by another computer system in operative communication with computer system 100. The GUI tool 84 is preferably configured to receive user input via a graphical user interface to perform various programming and testing operations relative to an ECU or otherwise adjusting internal parameters of the ECU 92 or acquiring current values of internal parameters and variables of the ECU 92.

In the illustrated embodiment, client interface 104 is self-sufficient in communicating via the GUI communication protocol utilized by GUI tool 84. In other embodiments, the client interface 104 may be supported by other components in communicating via the particular GUI communication protocol utilized by GUI tool 84 such as, for example, various windowing system components or other GUI communication or support components.

Client interface 106 is configured to bidirectionally communicate with a network tool 86 using a network communication protocol via a communication session 85 established between client interface 106 and network tool 86. The network tool 86 may comprise software stored in a nontransitory memory medium of and executed and operated by a computer system in networked communication with computer system 100. In some forms, the computer system 100 may include multiple networked computing devices and the networked communication may occur within networked devices of computer system 100. The network tool 86 is preferably configured to communicate using a networked communication protocol to perform various programming and testing operations relative to an ECU or otherwise adjusting internal parameters of the ECU 92 or acquiring current values of internal parameters and variables of the ECU 92.

In the illustrated embodiment, an ASAM server 116 supports the client interface 106 in communicating via the particular networked ASAM communication protocol utilized by network tool 86. In other embodiments, the client interface 106 may be supported by other components or may be self-sufficient in communicating via the particular scripting communication protocol utilized by network tool 86.

The plurality of client interfaces 110 may include a number of other types of client interfaces which are represented generally by client interface 108. Client interface 108 is configured to bidirectionally communicate with another type of ECU engineering tool 88 using a communication protocol via a communication session 87 established between client interface 108 and ECU engineering tool 88. The ECU engineering tool 88 may comprise software stored in a nontransitory memory medium of and executed and operated by computer system 100. Alternatively, the ECU engineering tool 88 may comprise software stored in a nontransitory memory medium of and executed and operated by another computer system in operative communication with computer system 100. The ECU engineering tool 88 is preferably configured to perform various programming and testing operations relative to an ECU or otherwise adjusting internal parameters of the ECU 92 or acquiring current values of internal parameters and variables of the ECU 92.

In the illustrated embodiment, a communication library 118 supports the client interface 108 in communicating via the particular communication protocol utilized by ECU engineering tool 88. In other embodiments, the client interface 108 may be supported by other components or may be self-sufficient in communicating via the particular communication protocol utilized by ECU engineering tool 88.

IMS 101 includes a machine-to-machine (M2M) interface 140 configured to bidirectionally communicate with ECU 92 using the particular communication protocol utilized by ECU 92 and established over communication link 91 (e.g., a measurement and calibration protocol such as XCP or a diagnostic protocol such as UDS or any of various proprietary communication protocols). It shall be appreciated that the particular communication protocol utilized by M2M interface 140 and ECU 92 differs from the communication protocols utilized by client interfaces 110 and ECU engineering tools 80. Furthermore, as indicated above, the particular communication protocol utilized by M2M interface 140 is limited to a single communication session with the ECU 92 per protocol stack of the communication protocol. The limitation to a single communication session may result from the technical definitions and requirements of a given protocol, for example, protocols such as XCP may inherently support only a single communication session. The limitation to a single communication session may result from rules imposed by a standard-setting or regulatory authority, for example, protocols such as UDS may be limited to a single communication session by such extechnical limits or rules. Such limitations may be accommodated by M2M interface 140 which provides an example of a singular ECU connection that supporting multiple concurrent access connections.

In the illustrated embodiment, a communication library 130 supports the M2M interface 140 in communicating via the particular communication protocol utilized by ECU 92. In other embodiments, the M2M interface 140 may be supported by other components or may be self-sufficient in communicating via the particular communication protocol utilized by ECU 92.

Figure 2:
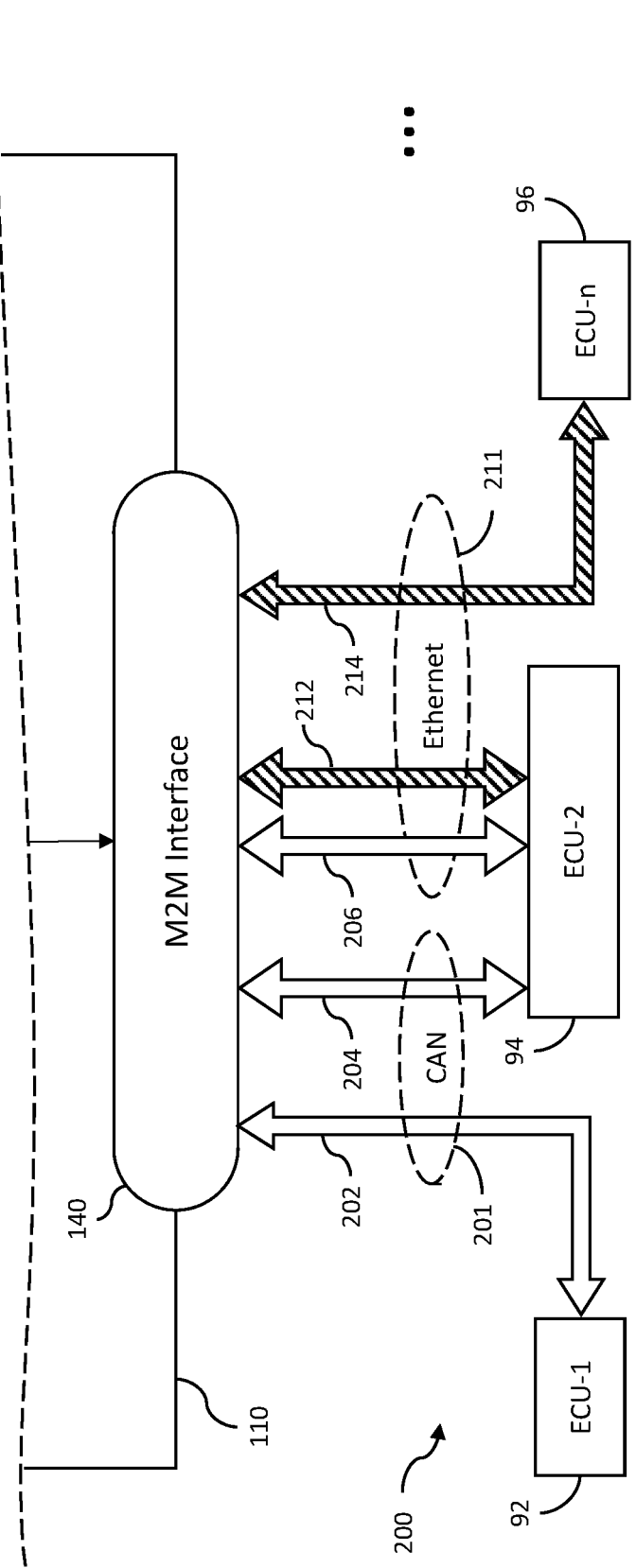
FIG. 2 is a schematic diagram illustrating certain aspects of an example operational state of the system of FIG. 1.

With reference to FIG. 2, there is illustrated an operating scenario 200 for M2M interface 140 with respect to a plurality of ECU including ECU 92, ECU 94, and ECU 96. While each communication protocol utilized M2M 140 to communication with a given ECU is limited to a single communication session with that ECU per protocol stack of that communication protocol, this does not preclude the possibility of operation including multiple communications sessions with multiple ECUs, or the possibility of operating including multiple different types of communication protocols with a given ECU. Thus, in the operating scenario 200, the M2M interface 140 may concurrently establish and operate an XCP protocol session 202 with ECU 92 over controller area network (CAN) 201, an XCP protocol session 204 with ECU 94 over CAN 201, an XCP protocol session 206 with ECU 94 over Ethernet 211, a UDS protocol session 212 with ECU 94 over Ethernet 211, and a UDS protocol session 214 with ECU 96 over Ethernet 211.

IMS 101 includes a connection manager 120 which is configured and operable to provide concurrent utilization of the aforementioned single communication session with the ECU by converting between the communication protocol utilized by M2M interface 140 configured to bidirectionally communicate with ECU 92 and two or more of the communication protocols utilized by the client interfaces 110 and the ECU engineering tools 80. The connection manager 120 is further configured and operable to multiplex and arbitrate communication between the M2M interface 140 and two or more of the client interfaces 110.

Figure 3:
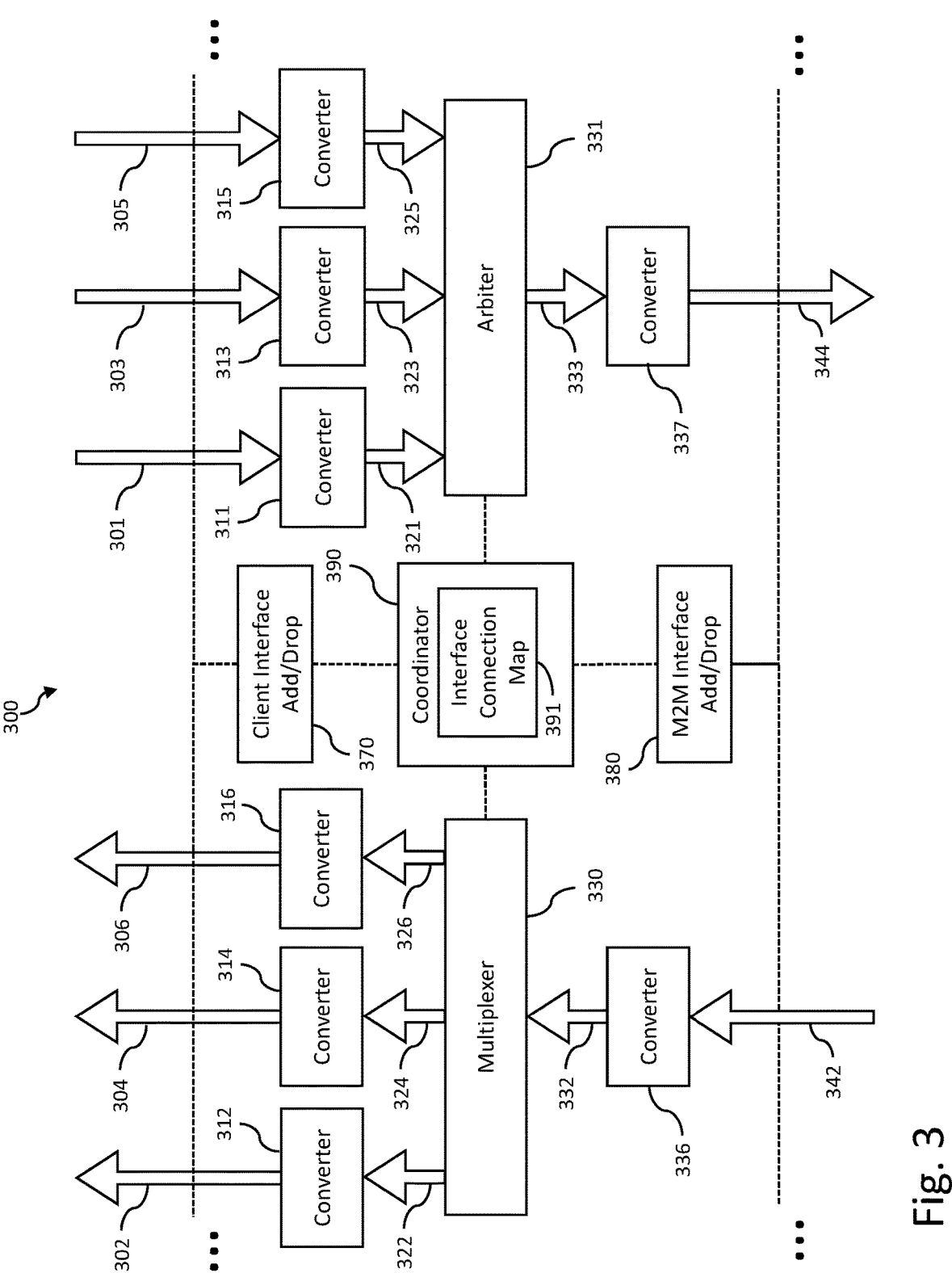
FIG. 3 is a schematic diagram illustrating certain aspects of example controls according to the present disclosure.

With reference to FIG. 3, there is illustrated communication multiplexing and arbitration controls 300 (also referred to herein as "controls 300") which may be implemented in a connection manager of an IMI such as connection manager 120 of IMS 101. Controls 300 are configured to receive a message 342 from an ECU according to a particular protocol utilized by the ECU, for example, an XCP protocol message or a UDS protocol message. The message 342 is provided to a converter 336 which converts the message 342 from the particular protocol utilized by the ECU and an M2M interface operatively coupled therewith to an intermediate protocol, and provides a converted message 332 to a multiplexer 330. The intermediate protocol may be an abstracted protocol and the converter 336 may be configured to perform an abstraction of the message 342 to the abstracted intermediate protocol of converted message 332. It shall be appreciated that the intermediate protocol may be implemented solely in code and need not require communication between multiple components or a separate protocol resource facilitating the same.

The multiplexer 330 multiplexes the converted message 332 into multiple converted message instances. In the illustrated embodiment, the multiple converted message instances include converted message 322, converted message 324, and converted message 326, it being appreciated that a greater or lesser number of two or more converter messages may be provided by multiplexer 330.

Converted message 322 is provided to converter 312 which converts the converted message 322 from the intermediate protocol to a particular protocol utilized by a client interface and an ECU engineering tool coupled therewith. For example, converter 312 may convert to the scripting protocol utilized by client interface 102 in communicating with scripting tool 82. Where the intermediate protocol is an abstracted protocol and the converter 312 may be configured to perform a de-abstraction of the converted message 322 to the particular protocol utilized by the client interface and the ECU engineering tool coupled therewith. Converter 312 outputs a twice-converted message 302 to a respective client interface such as client interface 102 which, in turn, provides the twice-converted message 302 to an ECU engineering tool such as scripting tool 82.

Converted message 324 is provided to converter 314 which converts the converted message 324 from the intermediate protocol to a particular protocol utilized by a client interface and an ECU engineering tool coupled therewith.

For example, converter 314 may convert to the GUI protocol utilized by client interface 104 in communicating with GUI tool 84. Where the intermediate protocol is an abstracted protocol and the converter 314 may be configured to perform a de-abstraction of the converted message 324 to the particular protocol utilized by the client interface and the ECU engineering tool coupled therewith. Converter 314 outputs a twice-converted message 304 to a respective client interface such as client interface 104, which, in turn, provides the twice-converted message 304 to an ECU engineering tool such as GUI tool 84.

Converted message 326 is provided to converter 316 which converts the converted message 326 from the intermediate protocol to a particular protocol utilized by a client interface and an ECU engineering tool coupled therewith. For example, converter 316 may convert to the network protocol utilized by client interface 106 in communicating with network tool 86. Where the intermediate protocol is an abstracted protocol and the converter 316 may be configured to perform a de-abstraction of the converted message 326 to the particular protocol utilized by the client interface and the ECU engineering tool coupled therewith. Converter 316 outputs a twice-converted message 306 to a respective client interface such as client interface 106 which, in turn, provides the twice-converted message 306 to an ECU engineering tool such as network tool 86.

Controls 300 are configured to receive a plurality of client messages from a respective plurality of client interfaces. In the illustrated embodiment, the plurality of client messages include client message 301, client message 303, and client message 305, it being appreciated that a greater or lesser number of two or more client interface messages may be received. Each of the plurality of client messages is in accordance with a particular communication protocol utilized by a respective client interface. For example, client message 301 may utilize and be in the form of the scripting protocol utilized by client interface 102 in communicating with scripting tool 82, client message 303 may utilize and be in the form of the GUI protocol utilized by client interface 104 in communicating with GUI tool 84, and client message 305 may utilize and be in the form of the network protocol utilized by client interface 106 in communicating with network tool 862.

The plurality of client messages are provided to respective converters that convert respective ones of the plurality of client messages from the particular protocol utilized by client interface and ECU engineering tool operatively coupled therewith to an intermediate protocol, and provides a converted message 332 to an arbiter 331. In the illustrated example, the plurality of converters include converter 311, converter 313, and converter 315 which respectively receive and convert client message 301, client message 303, and client message 305 to the intermediate protocol as converted message 321, converted message 323, and converted message 325, respectively. The intermediate protocol may be an abstracted protocol and the converters may be configured to perform an abstraction of the client message to the abstracted intermediate protocol of the converted message.

The arbiter 331 screens the converted message 321, converted message 323, and converted message 325 for potential conflicts, for example, two or more of converted message 321, converted message 323, and converted message 325 are seeing to perform the same or a conflicting or overlapping write operation or would impose duplicative operations on an ECU. The arbiter 331 applies prioritization rules to prevent a conflict between the converted message 321, converted message 323, and converted message 325, for example, the messages received via a given client interface may be given priority over messages received from one or more other client interfaces, certain message types may be given priority over other message types. Application of a prioritization rule may resolve potential conflicts by delaying certain ones of converted message 321, converted message 323, and converted message 325 or by terminating conflicting messages in favor of a prioritized message. Thus, arbiter 331 provides a single arbitrated converted message 333 to converter 337 at a given time.

Converter 337 converts the arbitrated converted message 333 from the intermediate protocol to a particular protocol utilized by an M2M interface and an ECU coupled therewith. Where the intermediate protocol is an abstracted protocol and the converter 337 may be configured to perform a de-abstraction of the arbitrated converted message 333 to the particular protocol utilized by the client interface and the ECU engineering tool coupled therewith. Converter 337 outputs a twice-converted arbitrated message 344 to a respective M2M interface such as M2M interface 140 which, in turn, provides the twice-converted arbitrated message 344 to an ECU such as ECU 92.

Controls 300 include coordinator 390 which is operatively coupled with the multiplexer 330, a client interface add/drop operator 370 and an M2M interface add/drop operator 380. Coordinator 390 maintains an interface connection map 391 which provides a record of the current interface connections and associated communication sessions of an IMI such as IMS 101. For example, for IMS 101 in the state illustrated in FIG. 1, the interface connection map 391 would record the connections with the plurality of client interfaces 110 and the M2M interface 140 as well as the communication sessions associated therewith. When support for a client interface is added by or dropped by client interface add/drop operator 370, the coordinator 390 may update the interface connection map 391 to reflect the addition or dropping of support for the client interface. Coordinator 390 may in some instances also command, initiate, or request client interface add/drop operator 370 to add or drop support for a client interface. Similarly, when support for an M2M interface is added by or dropped by M2M interface add/drop operator 380, the coordinator 390 may update the interface connection map 391 to reflect the addition or dropping of support for the M2M interface. The coordinator may 390 may in some instances also command, initiate, or request M2M interface add/drop operator 380 to add or drop support for an M2M interface.

As illustrated by this detailed description, multiple embodiments are contemplated. A first example embodiment is a computer system comprising: a first client interface configured to bidirectionally communicate with a first ECU engineering tool using a first communication protocol; a second client interface configured to bidirectionally communicate with a second ECU engineering tool using a second communication protocol differing from the first communication protocol; a machine-to-machine (M2M) interface configured to bidirectionally communicate with an electronic control unit (ECU) using a third communication protocol differing from the first communication protocol and the second communication protocol, the third communication protocol being limited to a single communication session with the ECU per protocol stack of the third communication protocol; and a connection manager configured to provide concurrent utilization of the single communication session with the ECU by at least the first client interface and the second client interface.

A second example embodiment includes the features of the first example embodiment, wherein the first communication protocol comprises a first one of a graphical user interface (GUI) protocol, a scripting protocol, and a network communication protocol, and the second communication protocol comprises a second one of the graphical user interface (GUI) protocol, the scripting protocol, and the network communication protocol differing from the first one.

A third example embodiment includes the features of the first example embodiment, wherein the connection manager is configured to multiplex communication received via the M2M interface to at least the first client interface and the second client interface.

A fourth example embodiment includes the features of the third example embodiment, wherein the connection manager is configured to: perform a first conversion of a message received via the M2M interface from a first communication protocol to an intermediate communication protocol to provide a converted message to a multiplexer, operate multiplexer to multiplex the converted message to a plurality of converted message instances, perform a second conversion of each of the plurality of converted message instances from the intermediate communication protocol to a plurality of different communication protocols to provide a respective plurality of twice-converted messages each corresponding to a respective one of the plurality of different communication protocols, and provide the plurality of twice-converted messages to a respective plurality of client interfaces including at least the first client interface and the second client interface.

A fifth example embodiment includes the features of the first example embodiment, wherein the connection manager is configured to arbitrate communication received via a plurality of client interfaces to provide an arbitrated output to the M2M interface, the plurality of client interfaces including at least the first client interface and the second client interface.

A sixth example embodiment includes the features of the fifth example embodiment, wherein the connection manager is configured to: perform a plurality of first conversions of a plurality of messages received via the plurality of client interfaces from a plurality of different communication protocols to an intermediate communication protocol to provide a plurality of converted messages to an arbiter, operate the arbiter arbitrate the plurality of converted messages to provide a converted arbitrated message, convert the converted arbitrated message to a twice-converted arbitrated message, and provided the twice-converted arbitrated message to the M2M interface.

A seventh example embodiment is method of operating a computer system, the method comprising: establishing a connection between a first client interface and a first ECU engineering tool using a first communication protocol; establishing a connection between a second client interface and a second ECU engineering tool using a second communication protocol differing from the first communication protocol; establishing a connection between a machine-to-machine (M2M) interface and an electronic control unit (ECU) using a third communication protocol differing from the first communication protocol and the second communication protocol, the third communication protocol being limited to a single communication session with the ECU per protocol stack of the third communication protocol; and operating a connection manager to provide concurrent utilization of the single communication session with the ECU by at least the first client interface and the second client interface.

An eighth example embodiment includes the features of the seventh example embodiment, wherein the first communication protocol comprises a first one of a graphical user interface (GUI) protocol, a scripting protocol, and a network communication protocol, and the second communication protocol comprises a second one of the graphical user interface (GUI) protocol, the scripting protocol, and the network communication protocol differing from the first one.

A ninth example embodiment includes the features of the seventh example embodiment, and comprises operating the connection manager to multiplex communication received via the M2M interface to at least the first client interface and the second client interface.

A tenth example embodiment includes the features of the ninth example embodiment, wherein the operating the connection manager to multiplex communication includes operating the connection manager to: perform a first conversion of a message received via the M2M interface from a first communication protocol to an intermediate communication protocol to provide a converted message to a multiplexer, operate multiplexer to multiplex the converted message to a plurality of converted message instances, perform a second conversion of each of the plurality of converted message instances from the intermediate communication protocol to a plurality of different communication protocols to provide a respective plurality of twice-converted messages each corresponding to a respective one of the plurality of different communication protocols, and provide the plurality of twice-converted messages to a respective plurality of client interfaces including at least the first client interface and the second client interface.

An eleventh example embodiment includes the features of the seventh example embodiment, and comprises operating the connection manager to arbitrate communication received via a plurality of client interfaces to provide an arbitrated output to the M2M interface, the plurality of client interfaces including at least the first client interface and the second client interface.

A twelfth example embodiment includes the features of the eleventh example embodiment, wherein operating the connection manager to arbitrate communication includes operating the connection manager to: perform a plurality of first conversions of a plurality of messages received via the plurality of client interfaces from a plurality of different communication protocols to an intermediate communication protocol to provide a plurality of converted messages to an arbiter, operate the arbiter arbitrate the plurality of converted messages to provide a converted arbitrated message, convert the converted arbitrated message to a twice-converted arbitrated message, and provided the twice-converted arbitrated message to the M2M interface.

A thirteenth example embodiment is an apparatus comprising: a non-transitory computer-readable memory medium configured with instructions executable by a computer to perform the acts of: establishing a connection between a first client interface and a first ECU engineering tool using a first communication protocol, establishing a connection between a second client interface and a second ECU engineering tool using a second communication protocol differing from the first communication protocol, establishing a connection between a machine-to-machine (M2M) interface and an electronic control unit (ECU) using a third communication protocol differing from the first communication protocol and the second communication protocol, the third communication protocol being limited to a single communication session with the ECU per protocol stack of the third communication protocol, and operating a connection manager to provide concurrent utilization of the single communication session with the ECU by at least the first client interface and the second client interface.

A fourteenth example embodiment includes the features of the thirteenth example embodiment, wherein the first communication protocol comprises a first one of a graphical user interface (GUI) protocol, a scripting protocol, and a network communication protocol, and the second communication protocol comprises a second one of the graphical user interface (GUI) protocol, the scripting protocol, and the network communication protocol differing from the first one.

A fifteenth example embodiment includes the features of the fourteenth example embodiment, wherein the instructions include instructions to operate the connection manager to multiplex communication received via the M2M interface to at least the first client interface and the second client interface.

A sixteenth example embodiment includes the features of the fifteenth example embodiment, wherein the instructions include instructions to operate the connection manager to: perform a first conversion of a message received via the M2M interface from a first communication protocol to an intermediate communication protocol to provide a converted message to a multiplexer, operate multiplexer to multiplex the converted message to a plurality of converted message instances, perform a second conversion of each of the plurality of converted message instances from the intermediate communication protocol to a plurality of different communication protocols to provide a respective plurality of twice-converted messages each corresponding to a respective one of the plurality of different communication protocols, and provide the plurality of twice-converted messages to a respective plurality of client interfaces including at least the first client interface and the second client interface.

A seventeenth example embodiment includes the features of the thirteenth example embodiment, wherein the instructions include instructions to operate the connection manager to arbitrate communication received via a plurality of client interfaces to provide an arbitrated output to the M2M interface, the plurality of client interfaces including at least the first client interface and the second client interface.

An eighteenth example embodiment includes the features of the seventeenth example embodiment, wherein the instructions include instructions to operate the connection manager to: perform a plurality of first conversions of a plurality of messages received via the plurality of client interfaces from a plurality of different communication protocols to an intermediate communication protocol to provide a plurality of converted messages to an arbiter, operate the arbiter arbitrate the plurality of converted messages to provide a converted arbitrated message, convert the converted arbitrated message to a twice-converted arbitrated message, and provided the twice-converted arbitrated message to the M2M interface.

A nineteenth example embodiment includes the features of the thirteenth example embodiment, wherein the non-transitory computer-readable memory medium is provided in an electronic control unit.

A twentieth example embodiment includes the features of the nineteenth example embodiment, wherein the electronic control unit is provided on a vehicle.

While example embodiments of the disclosure have been illustrated and described in detail in the drawings and foregoing description, the same is to be considered as illustrative and not restrictive in character, it being understood that only certain example embodiments have been shown and described and that all changes and modifications that come within the spirit of the claimed inventions are desired to be protected. It should be understood that while the use of words such as preferable, preferably, preferred, or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A computer system comprising:
   a first client interface configured to bidirectionally communicate with a first ECU engineering tool using a first communication protocol;
   a second client interface configured to bidirectionally communicate with a second ECU engineering tool using a second communication protocol differing from the first communication protocol;
   a machine-to-machine (M2M) interface configured to bidirectionally communicate with an electronic control unit (ECU) using a third communication protocol differing from the first communication protocol and the second communication protocol, the third communication protocol being limited to a single communication session with the ECU per protocol stack of the third communication protocol; and
   a connection manager configured to provide concurrent utilization of the single communication session with the ECU by at least the first client interface and the second client interface.

2. The system of claim 1, wherein the first communication protocol comprises a first one of a graphical user interface (GUI) protocol, a scripting protocol, and a network communication protocol, and the second communication protocol comprises a second one of the graphical user interface (GUI) protocol, the scripting protocol, and the network communication protocol differing from the first one.

3. The system of claim 1, wherein the connection manager is configured to multiplex communication received via the M2M interface to at least the first client interface and the second client interface.

4. The system of claim 3, wherein the connection manager is configured to:
   perform a first conversion of a message received via the M2M interface from a first communication protocol to an intermediate communication protocol to provide a converted message to a multiplexer,
   operate multiplexer to multiplex the converted message to a plurality of converted message instances,
   perform a second conversion of each of the plurality of converted message instances from the intermediate communication protocol to a plurality of different communication protocols to provide a respective plurality of twice-converted messages each corresponding to a respective one of the plurality of different communication protocols, and
   provide the plurality of twice-converted messages to a respective plurality of client interfaces including at least the first client interface and the second client interface.

5. The system of claim 1, wherein the connection manager is configured to arbitrate communication received via a plurality of client interfaces to provide an arbitrated output to the M2M interface, the plurality of client interfaces including at least the first client interface and the second client interface.

6. The system of claim 5, wherein the connection manager is configured to:
   perform a plurality of first conversions of a plurality of messages received via the plurality of client interfaces from a plurality of different communication protocols to an intermediate communication protocol to provide a plurality of converted messages to an arbiter,
   operate the arbiter arbitrate the plurality of converted messages to provide a converted arbitrated message,
   convert the converted arbitrated message to a twice-converted arbitrated message, and
   provided the twice-converted arbitrated message to the M2M interface.

7. A method of operating a computer system, the method comprising:
   establishing a connection between a first client interface and a first ECU engineering tool using a first communication protocol;
   establishing a connection between a second client interface and a second ECU engineering tool using a second communication protocol differing from the first communication protocol;
   establishing a connection between a machine-to-machine (M2M) interface and an electronic control unit (ECU) using a third communication protocol differing from the first communication protocol and the second communication protocol, the third communication protocol being limited to a single communication session with the ECU per protocol stack of the third communication protocol; and
   operating a connection manager to provide concurrent utilization of the single communication session with the ECU by at least the first client interface and the second client interface.

8. The method of claim 7, wherein the first communication protocol comprises a first one of a graphical user interface (GUI) protocol, a scripting protocol, and a network communication protocol, and the second communication protocol comprises a second one of the graphical user interface (GUI) protocol, the scripting protocol, and the network communication protocol differing from the first one.

9. The method of claim 7, comprising operating the connection manager to multiplex communication received via the M2M interface to at least the first client interface and the second client interface.

10. The method of claim 9, wherein the operating the connection manager to multiplex communication includes operating the connection manager to:
   perform a first conversion of a message received via the M2M interface from a first communication protocol to an intermediate communication protocol to provide a converted message to a multiplexer, operate multiplexer to multiplex the converted message to a plurality of converted message instances, perform a second conversion of each of the plurality of converted message instances from the intermediate communication protocol to a plurality of different communication protocols to provide a respective plurality of twice-converted messages each corresponding to a respective one of the plurality of different communication protocols, and provide the plurality of twice-converted messages to a respective plurality of client interfaces including at least the first client interface and the second client interface.

11. The method of claim 7, comprising operating the connection manager to arbitrate communication received via a plurality of client interfaces to provide an arbitrated output to the M2M interface, the plurality of client interfaces including at least the first client interface and the second client interface.

12. The method of claim 11, wherein operating the connection manager to arbitrate communication includes operating the connection manager to:

perform a plurality of first conversions of a plurality of messages received via the plurality of client interfaces from a plurality of different communication protocols to an intermediate communication protocol to provide a plurality of converted messages to an arbiter, operate the arbiter arbitrate the plurality of converted messages to provide a converted arbitrated message, convert the converted arbitrated message to a twice-converted arbitrated message, and provided the twice-converted arbitrated message to the M2M interface.

13. An apparatus comprising:

a non-transitory computer-readable memory medium configured with instructions executable by a computer to perform the acts of:

establishing a connection between a first client interface and a first ECU engineering tool using a first communication protocol, establishing a connection between a second client interface and a second ECU engineering tool using a second communication protocol differing from the first communication protocol, establishing a connection between a machine-to-machine (M2M) interface and an electronic control unit (ECU) using a third communication protocol differing from the first communication protocol and the second communication protocol, the third communication protocol being limited to a single communication session with the ECU per protocol stack of the third communication protocol, and operating a connection manager to provide concurrent utilization of the single communication session with the ECU by at least the first client interface and the second client interface.

14. The apparatus of claim 13, wherein the first communication protocol comprises a first one of a graphical user interface (GUI) protocol, a scripting protocol, and a network communication protocol, and the second communication protocol comprises a second one of the graphical user interface (GUI) protocol, the scripting protocol, and the network communication protocol differing from the first one.

15. The apparatus of claim 13, wherein the instructions include instructions to operate the connection manager to multiplex communication received via the M2M interface to at least the first client interface and the second client interface.

16. The apparatus of claim 15, wherein the instructions include instructions to operate the connection manager to:

perform a first conversion of a message received via the M2M interface from a first communication protocol to an intermediate communication protocol to provide a converted message to a multiplexer, operate multiplexer to multiplex the converted message to a plurality of converted message instances, perform a second conversion of each of the plurality of converted message instances from the intermediate communication protocol to a plurality of different communication protocols to provide a respective plurality of twice-converted messages each corresponding to a respective one of the plurality of different communication protocols, and provide the plurality of twice-converted messages to a respective plurality of client interfaces including at least the first client interface and the second client interface.

17. The apparatus of claim 13, wherein the instructions include instructions to operate the connection manager to arbitrate communication received via a plurality of client interfaces to provide an arbitrated output to the M2M interface, the plurality of client interfaces including at least the first client interface and the second client interface.

18. The apparatus of claim 17, wherein the instructions include instructions to operate the connection manager to:

perform a plurality of first conversions of a plurality of messages received via the plurality of client interfaces from a plurality of different communication protocols to an intermediate communication protocol to provide a plurality of converted messages to an arbiter, operate the arbiter arbitrate the plurality of converted messages to provide a converted arbitrated message, convert the converted arbitrated message to a twice-converted arbitrated message, and provided the twice-converted arbitrated message to the M2M interface.

19. The apparatus of claim 13, wherein the non-transitory computer-readable memory medium is provided in an electronic control unit.

20. The apparatus of claim 19, wherein the electronic control unit is provided on a vehicle.

* * * * *